United States Patent
Ward et al.

(10) Patent No.: US 9,860,587 B2
(45) Date of Patent: Jan. 2, 2018

(54) METHODS AND SYSTEMS FOR BYPASSING PREEMPTIONS IN RECORDED MEDIA ASSETS

(71) Applicant: Rovi Guides, Inc., Santa Clara, CA (US)

(72) Inventors: Daniel Thomas Ward, Encino, CA (US); Arevik Chimayan, Valley Village, CA (US); Walter R. Klappert, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/970,751

(22) Filed: Dec. 16, 2015

(65) Prior Publication Data

US 2017/0180785 A1   Jun. 22, 2017

(51) Int. Cl.
| | |
|---|---|
| *H04N 21/235* | (2011.01) |
| *H04N 21/433* | (2011.01) |
| *H04N 21/4363* | (2011.01) |
| *H04N 21/482* | (2011.01) |
| *H04N 21/658* | (2011.01) |
| *H04N 21/81* | (2011.01) |
| *H04N 21/458* | (2011.01) |
| *H04N 21/472* | (2011.01) |
| *H04N 21/414* | (2011.01) |

(52) U.S. Cl.
CPC ... *H04N 21/4334* (2013.01); *H04N 21/43637* (2013.01); *H04N 21/4583* (2013.01); *H04N 21/47202* (2013.01); *H04N 21/4821* (2013.01); *H04N 21/6581* (2013.01); *H04N 21/814* (2013.01); *H04N 21/41407* (2013.01)

(58) Field of Classification Search
CPC combination set(s) only.
See application file for complete search history.

(56) References Cited

U.S. PATENT DOCUMENTS

| | | |
|---|---|---|
| 2002/0039390 A1 | 4/2002 | Koike |
| 2005/0118984 A1 | 6/2005 | Akiyama et al. |
| 2006/0222325 A1 | 10/2006 | Ellis |
| 2007/0204291 A1 | 8/2007 | Ichihashi |
| 2010/0153984 A1 | 6/2010 | Neufeld |

(Continued)

FOREIGN PATENT DOCUMENTS

WO   WO-2009/096185 A1   8/2009

*Primary Examiner* — Kieu Oanh T Bui
(74) *Attorney, Agent, or Firm* — Haley Guiliano LLP

(57) ABSTRACT

Methods and systems for receiving an interruption-free version of a television program for recording on a user equipment device. In one aspect, a device receives from a server a first stream including a television program. The device receives user input to record the television program. The device identifies a recording channel identifier for the first stream. The device initiates a recording of the television program based on the recording channel identifier for the first stream. The device receives from the server an instruction to switch recording of the television program from the first stream to a second stream. The device receives from the server the second stream including the television program. The device identifies a recording channel identifier for the second stream. The device switches the recording of the television program to the second stream based on the recording channel identifier for the second stream.

20 Claims, 9 Drawing Sheets

(56) References Cited

U.S. PATENT DOCUMENTS

2010/0211970 A1    8/2010   Howarter et al.
2010/0211971 A1    8/2010   Howarter et al.
2011/0302609 A1*  12/2011   Hems ................ H04N 5/44543
                                              725/40

* cited by examiner

```
600  ...                              600
601  Initialization Subroutine
602  ...
603  // Routine to determine whether an interruption is
     imminent during transmission of a television program:
604
605  Retrieve metadata for the television program from memory
606  For each interruption imminent during transmission of the
     television program:
607          Identify Information in the metadata relating to
             an interruption during transmission of the
             television program
608          if metadata indicates the television program is
             not being recorded on a user equipment device:
609                  Execute subroutine to return message
                     that an interruption-free version of the
                     television program is not needed at the
                     user equipment device
610                  Break out of loop
611          else if metadata indicates the television program
             is being recorded on a user equipment device:
612                  Execute subroutine to generate an
                     interruption-free version of the television
                     program for recording on the user
                     equipment device
613                  Break out of loop
614  ...
615  Termination Subroutine
616  ...
```

801 Initialization Subroutine

802 ...

803 // Routine to determine whether an interruption is imminent during transmission of a television program:

804

805 Retrieve identifying information for the television program from memory

806 For each interruption imminent during transmission of the television program:

807     Access database containing information relating to interruption during transmission of a plurality of programs 808     Search database tables for entries matching the identifying information for the television program 809     if the identifying information indicates the television program is <u>not</u> being recorded on a user equipment device:

810         Execute subroutine to return message that an interruption-free version of the television program is not needed at the user equipment device 811         Break out of loop 812     else if the identifying information indicates the television program is being recorded on a user equipment device:

813         Execute subroutine to generate an interruption-free version of the television program for recording on the user equipment device 814         Break out of loop

815 ...

816 Termination Subroutine

METHODS AND SYSTEMS FOR BYPASSING PREEMPTIONS IN RECORDED MEDIA ASSETS

BACKGROUND OF THE INVENTION

In conventional systems, a user viewing a television program may receive an interruption during broadcast, such as an emergency alert message, an unscheduled news broadcast, or be otherwise preempted from viewing the television program. This is because service providers are typically required to participate in such emergency alert services. Even if the user is not currently viewing the television program but is instead recording the television program, the interruption is included in the recording and persists when the user tries to watch the recorded television program at a later time. Conventional systems lack the ability to address this preemption issue in recorded television programs.

SUMMARY

Accordingly, methods and systems are disclosed herein for transmitting and receiving an interruption-free version of a television program for recording on a user equipment device. For example, an interruption or preemption may be received from the Emergency Alert System, which is a national public warning system that requires broadcasters, cable television systems, wireless cable systems, satellite cable systems, and other suitable providers to provide communications capability to the President to address the American public during a national emergency. The system may also be used by state and local authorities to deliver important emergency information, such as AMBER alerts, weather information, and other suitable information targeted to specific areas. In another example, an interruption or preemption may be received in the form of an unscheduled news broadcast regarding a newsworthy event. If a television program is being recorded during transmission of such an emergency message, the message is included in the recorded television program as well.

In some aspects, the methods and systems disclosed herein provide for control circuitry, e.g., control circuitry of a server located at a service provider, that is configured to transmit an interruption-free version of a television program for recording on a user equipment device. The server may include communications circuitry in communication with the user equipment device. The control circuitry transmits a first stream including a television program to the user equipment device. For example, the control circuitry of the server located at the service provider may transmit a stream for a football game the user wishes to watch. The control circuitry receives an indication from the user equipment device that the television program is being recorded. For example, the user may wish to record the football game for viewing at a later time.

The control circuitry determines whether an interruption is imminent during transmission of the television program. For example, the control circuitry may inspect metadata of the television program to determine that an interruption or preemption is scheduled during the transmission of the football game. In another example, the control circuitry may query a database to determine whether an interruption or preemption is scheduled during the transmission of the football game. In yet another example, the control circuitry may determine or receive an indication of an imminent interruption via any other suitable mechanism.

In response to determining that an interruption is imminent during the transmission of the television program, the control circuitry generates a second stream including the television program. The second stream includes the television program but does not include the interruption during the transmission of the television program. For example, after determining that the football game is about to be interrupted by an emergency message, the control circuitry may generate a second stream including the football game. This stream does not include the emergency message imminent during transmission of the football game in the first stream.

The control circuitry transmits the second stream to the user equipment device. The control circuitry also transmits an instruction to the user equipment device to switch recording of the television program from the first stream to the second stream. For example, the user equipment device switches the source of the recording of the football game from the first stream to the second stream. However, the first stream continues to be shown to the user in case he or she is watching the football game while it is being recorded. The emergency message is still shown to the user watching the football game live but is excluded from the recorded television program on the user equipment device.

In some aspects, the methods and systems disclosed herein provide for control circuitry, e.g., control circuitry of a user equipment device, that is configured to receive an interruption-free version of a television program for recording on the user equipment device. The user equipment device may include communications circuitry in communication with a server transmitting the television program. The control circuitry receives from the server a first stream including the television program. For example, the control circuitry of the user equipment device may receive a stream for a football game the user wishes to watch. The control circuitry receives user input at the user equipment device to record the television program. For example, the user may wish to record the football game for viewing at a later time.

The control circuitry identifies a recording channel identifier for the first stream. For example, the recording channel identifier assists the user equipment device in recording the stream including the football game. The control circuitry initiates recording of the television program based on the recording channel identifier for the first stream. The control circuitry receives an instruction to switch recording of the television program from the first stream to a second stream. For example, the user equipment device may receive an instruction to switch the source of the recording of the football game from the first stream to the second stream.

The control circuitry receives from the server the second stream including the television program. For example, the second stream may not include an emergency message imminent during transmission of the football game in the first stream. The control circuitry identifies a recording channel identifier for the second stream. For example, the recording channel identifier assists the user equipment device in recording the stream including the football game. The control circuitry switches the recording of the television program to the second stream based on the recording channel identifier for the second stream. However, the first stream continues to be shown to the user in case he or she is watching the football game while it is being recorded. The emergency message is still shown to the user watching the football game live but is excluded from the recorded television program on the user equipment device.

The methods and systems described herein are advantageous over conventional systems because the user is not aware that the source of the recorded television program has been switched. The service provider complies with their requirement to transmit the emergency message to the user while he or she is watching the television program. At the same time, the user equipment device advantageously stores an interruption-free version of the television program that the user can watch at a later time without the interruption being included during the recording.

In some embodiments, the interruption imminent during the transmission of the television program includes one or more of an emergency alert message, an unscheduled news broadcast, or another suitable interruption or preemption. For example, the television program may be interrupted or preempted by an emergency alert message for an urgent weather notification, a Presidential announcement, or another suitable message. In another example, the television program may be interrupted or preempted by a local news broadcast of a noteworthy event, such as a car chase involving hot pursuit of suspects by local police.

In some embodiments, the instruction to switch the recording of the television program from the first stream to the second stream includes a recording channel identifier for the second stream. The recording channel identifier assists the user equipment in switching the recording of the television program from the first stream to the second stream. Alternatively, the user equipment device may query a database or another data source for the recording channel identifier for the second stream. In some embodiments, the user equipment device switches recording of the television program from a recording channel identifier for the first stream to the recording channel identifier for the second stream.

In some embodiments, a user viewing the television program on the user equipment device at substantially the same time as the transmission of the television program experiences the interruption during the television program. Because content providers are required to comply and transmit the emergency alert system messages as they are received, the user viewing a television program as it is broadcast, such as a football game, may receive the emergency message as intended. In some embodiments, even if the user is watching a buffered version of the television program at substantially the same time, the user still receives the emergency alert message. In this embodiment, the buffered version of the television program continues to be retrieved from the first stream, while the version of the television program being recorded is retrieved from the second stream.

In some embodiments, a user viewing the television program on the user equipment device at a time after the transmission of the television program does not experience the interruption during the television program. Because content providers are required to transmit emergency messages as they are received, they are not necessarily required to include the emergency messages in recorded versions of the television program. For example, the video-on-demand version of a television program, which may have been interrupted by an emergency message when being broadcast, may not include the interruption when viewed at a later time. Similarly, a recorded version of the television program may not include the interruption when the user is viewing the television program at a later time.

In some embodiments, the second stream is generated as a switched digital video stream. Switched digital video technology typically sends only channels requested by viewers and saves content provider bandwidth. The technology may be used to create a second stream of the television program the user is currently recording. The systems and methods described herein may be applied using this technology to send the second stream to the user equipment device absent the imminent interruption in the television program.

In some embodiments, a user viewing the television program on the user equipment device at a time after the transmission of the television program receives an option to view the television program via a video-on-demand service. For example, the user may set a recording for "Young and the Restless" for 12:30 pm. Unfortunately, at 12:45 pm, a car chase began between the local police and three thieves in a Ferrari. The television provider broadcasting "Young and the Restless" may decide to interrupt the television program with helicopter footage of the car chase. The television provider may expect more viewers to tune in for the car chase rather than the daytime drama. In the evening that day, when the user selects the "Young and the Restless" recording, the user equipment device may generate for display an option to view the television program via a video-on-demand service instead.

In some embodiments, when the television program is interrupted or expected to be interrupted with an emergency message, the television provider (or a video distributor or another suitable service provider) may initiate a recording of the television program, excluding the emergency message, on a server or another suitable device at their facility or elsewhere in the cloud. The uninterrupted recording of the television program may be stored by the television provider for future use by their subscribers as a video-on-demand version of the television program. This may be advantageous to the user because cloud-based access to the television program may allow the user equipment device to receive the uninterrupted recording of the television program from the cloud rather than storing content locally and using the memory of the user equipment device.

In some embodiments, a user viewing the television program on the user equipment device at a time after the transmission of the television program receives an option to record the television program at another time when the television program is rebroadcast. Following the example discussed above, when the user selects the "Young and the Restless" recording, the user equipment device may generate for display an option to record the television program again when it is rebroadcast, e.g., at a later time that night or the next day.

In some embodiments, the second stream is generated in response to receiving a threshold number of indications from a plurality of user equipment devices that the television program is being recorded. The process of generating a second stream of the television program may use bandwidth at the content provider's systems. Moreover, if second streams are generated for a significant number of television programs, the bandwidth requirements may easily increase twofold. To address this issue, the content provider system may generate a second stream for a television program only if a threshold number of users are recording the program. The content provider system may receive indications from user equipment devices when users initiate recording of the television program. If an interruption is imminent during transmission of the television program, the content provider system may only generate and transmit a second stream excluding the interruption if a threshold number of user equipment devices have indicated that the television program is being recorded.

In some embodiments, the interruption is imminent during transmission of the television program from the first stream while the interruption is absent during recording of the television program from the second stream. As discussed above, this is advantageous over conventional systems because the service provider complies with their requirement to transmit the emergency message to the user while he or she is watching the television program. At the same time, the user equipment device advantageously stores an interruption-free version of the television program that the user can watch at a later time without the interruption being included during the recording.

It should be noted that the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 is pseudocode of illustrative steps for determining whether an interruption is imminent during transmission of a television program in accordance with some embodiments of the disclosure;

FIG. 8 is pseudocode of an illustrative process for using a database to determine whether an interruption is imminent during transmission of a television program in accordance with some embodiments of the disclosure;

DETAILED DESCRIPTION

Figure 1:
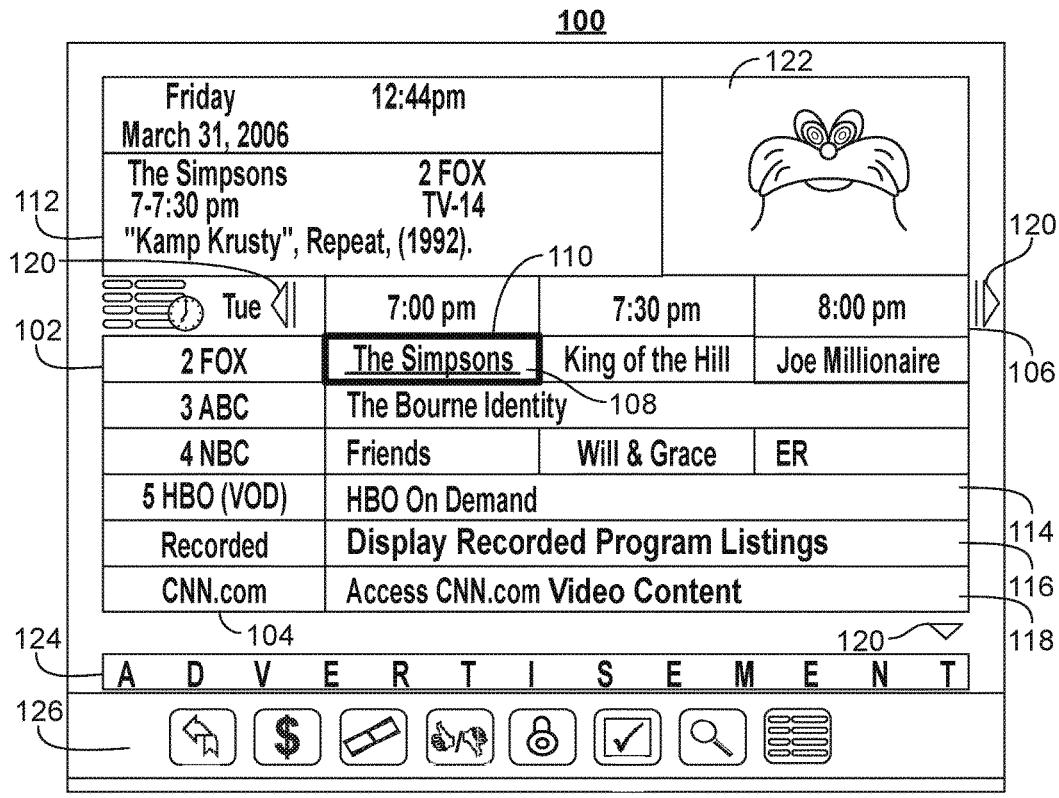
FIG. 1 shows an illustrative example of a display screen generated by a media guidance application in accordance with some embodiments of the disclosure.

In some aspects, methods and systems for transmitting an interruption-free version of a television program for recording on a user equipment device are described. A system transmits a first stream including a television program to a user equipment device. The system receives an indication that the television program is being recorded on the user equipment device. The system determines whether an interruption is imminent during transmission of the television program. In response to determining that the interruption is imminent, the system generates a second stream including the television program. The second stream does not include the interruption during the transmission of the television program. The system transmits the second stream to the user equipment device along with an instruction to switch recording of the television program from the first stream to the second stream. The systems and methods for transmitting an interruption-free version of the television program for recording may be implemented on a server, such as a television distribution server, cable system headend, satellite distribution server, programming sources server, intermediate distribution facilities and/or servers, an Internet provider server, an on-demand media server, or another suitable server.

In some aspects, methods and systems for receiving an interruption-free version of a television program for recording on a user equipment device are described. A device receives from a server a first stream including a television program. The device receives user input to record the television program. The device identifies a recording channel identifier for the first stream. The device initiates a recording of the television program based on the recording channel identifier for the first stream. The device receives from the server an instruction to switch recording of the television program from the first stream to a second stream. The device receives from the server the second stream including the television program. The device identifies a recording channel identifier for the second stream. The device switches the recording of the television program to the second stream based on the recording channel identifier for the second stream. The systems and methods for receiving an interruption-free version of the television program for recording may be implemented on a user equipment device, such as a smart television, a set top box, a dongle (a small piece of hardware) or another suitable user equipment device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
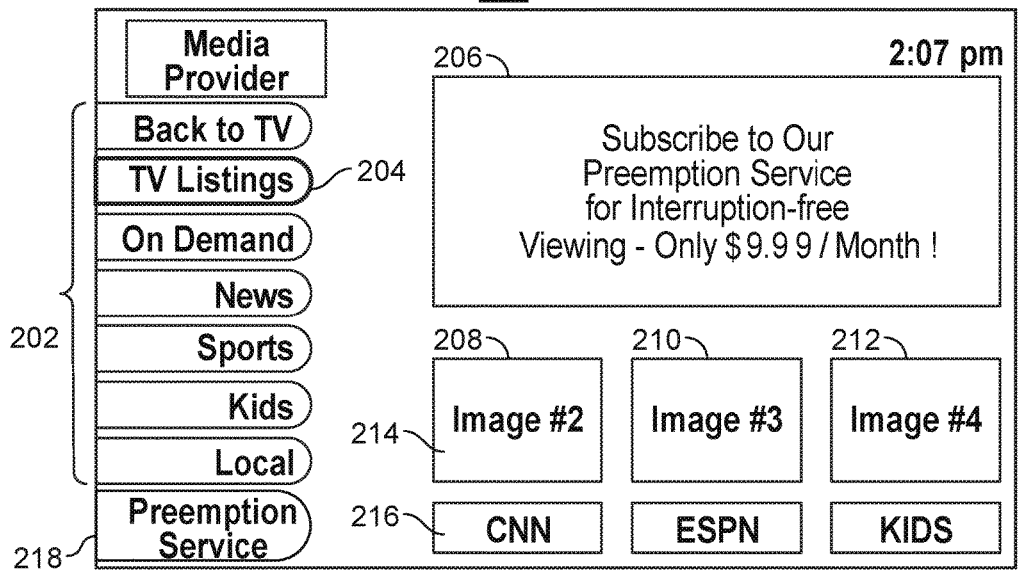
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, window 206 provides information regarding the preemption service for interruption-free viewing of recorded programs. The viewer may subscribe to the preemption service for free or in exchange for a payment by selecting option 218. The preemption service may exclude interruptions or preemptions from recorded programs so that when the viewer watches the recorded program at a later time, the viewer's experience is not interrupted or preempted by an emergency alert or similar message.

In display 200, television listings option 204 is selected, thus providing listings 208, 210, and 212 as broadcast program listings. In display 200, the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 may be of different sizes, but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
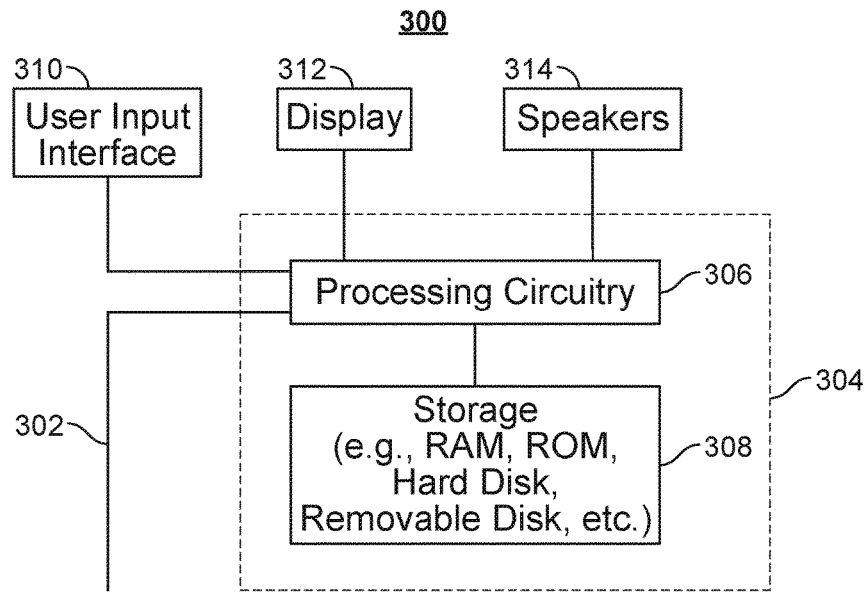
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
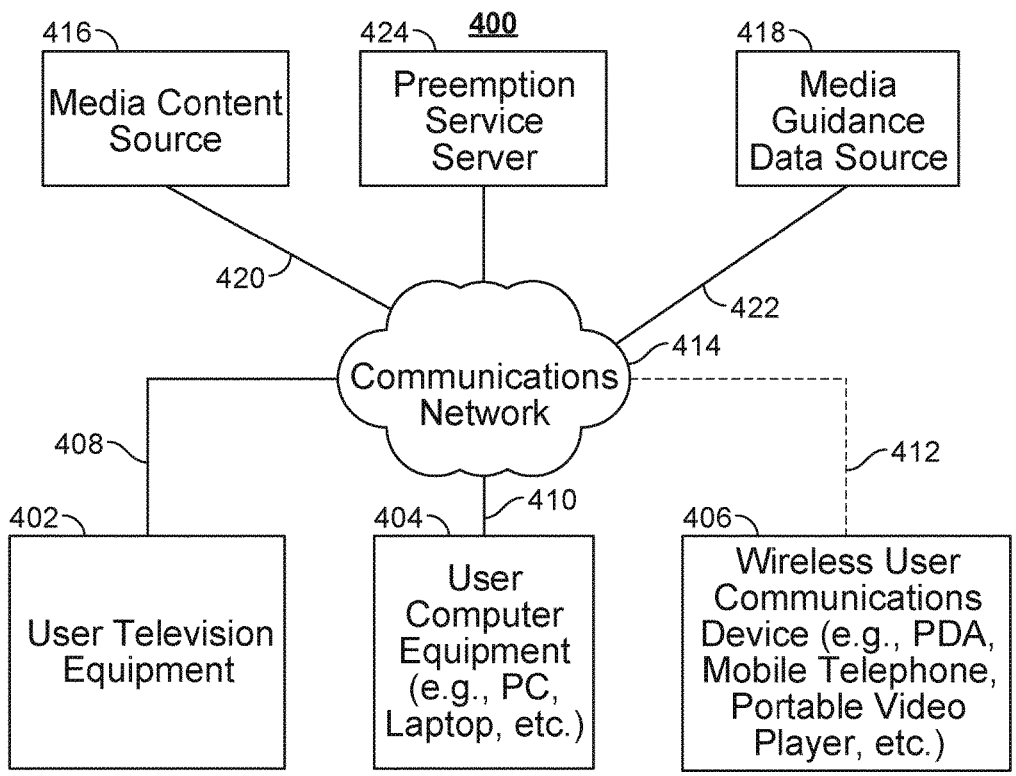
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and preemption service server 424 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. The different types of each of these sources are discussed below. If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Preemption service server 424 may implement part or all of the systems and methods described herein for transmitting an interruption-free version of a television program for recording. Preemption service server 424 may retrieve and/or provide information regarding imminent interruptions or preemptions during transmission of a television program. Preemption service server may assist in generating an alternate stream to user equipment device recording the television program such that the alternate stream excludes the interruption or preemption. Preemption service server 424 may be a television distribution server, cable system headend, satellite distribution server, programming sources server, intermediate distribution facilities and/or servers, an Internet provider server, an on-demand media server, or another suitable server.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
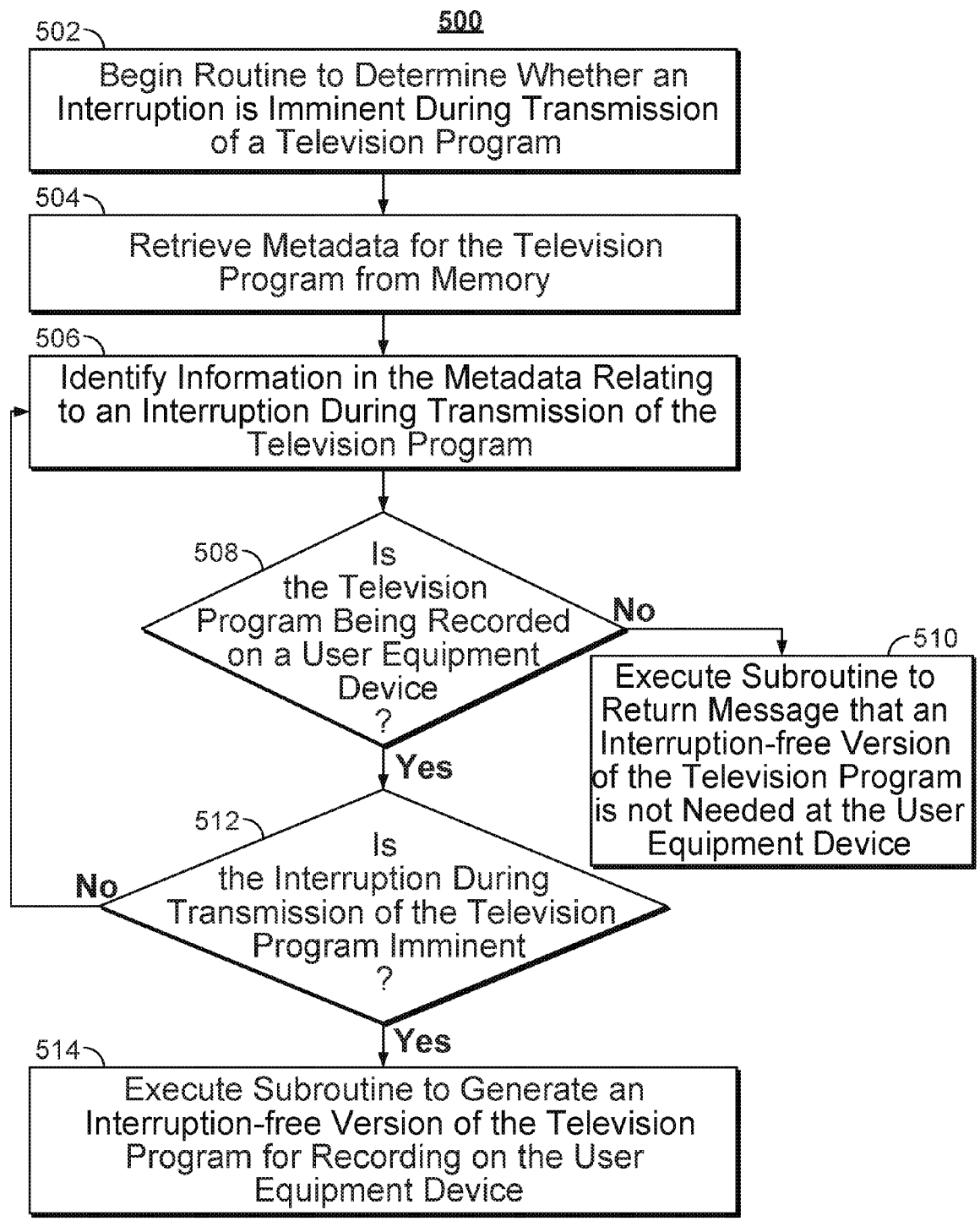
FIG. 5 is a flowchart of illustrative steps for determining whether an interruption is imminent during transmission of a television program in accordance with some embodiments of the disclosure.

FIGS. 5 and 6 present an algorithm for control circuitry (e.g., control circuitry 304 or control circuitry of preemption service server 424) to determine whether an interruption is imminent during transmission of a television program in accordance with some embodiments of the disclosure. In some embodiments, this algorithm may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes a process implemented on control circuitry (e.g., control circuitry 304 or control circuitry of preemption service server 424) to determine whether an interruption is imminent during transmission of a television program in accordance with some embodiments of the disclosure.

At step 502, control circuitry 304 begins a routine to determine whether an interruption is imminent during transmission of a television program. In some embodiments, this may be done either directly or indirectly in response to a user action or input (e.g., from signals received by control circuitry 304 or user input interface 310). For example, the process may begin directly in response to control circuitry 304 receiving signals from user input interface 310, or control circuitry 304 may prompt the user to confirm their input using a display (e.g., by generating a prompt to be displayed on display 312) prior to running the algorithm.

At step 504, control circuitry 304 proceeds to retrieve metadata for the television program from memory. In some embodiments control circuitry 304 may receive a single primitive data structure that represents the metadata for the television program. At step 506, control circuitry 304 proceeds to identify information in the metadata relating to an interruption during transmission of the television program. In some embodiments the metadata for the television program may be stored as part of a larger data structure, and control circuitry 304 may retrieve the information relating to the interruption during transmission of the television program by executing appropriate accessor methods on the larger data structure.

At step 508, control circuitry 304 proceeds to determine whether the television program is being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication. In some instances, control circuitry 304 may call a comparison function (e.g., for object to object comparison) to compare an indication the television program is being recorded and the indication received from the user equipment device. If the condition is satisfied, the algorithm may proceed to step 512; if the condition is not satisfied, the algorithm may proceed to step 510 instead.

At step 510, control circuitry 304 executes a subroutine to return a message that an interruption-free version of the television program is not needed at the user equipment device based on the condition at step 508 being not satisfied. Because the television program is not being recorded on the user equipment device, control circuitry 304 need not generate another stream of the television program, excluding the interruption, for recording on the user equipment device.

At step 512, control circuitry 304 determines whether the interruption is imminent during transmission of the television program. Control circuitry 304 may use the information identified in the metadata relating to an interruption during transmission of the television program. If the condition is satisfied, the algorithm may proceed to step 514; if the condition is not satisfied, the algorithm may proceed to step 506 instead.

At step 514, control circuitry 304 executes a subroutine to generate an interruption-free version of the television program for recording on the user equipment device based on the condition at step 512 being satisfied. Because the television program is being recorded on the user equipment device, control circuitry 304 generates another stream of the television program, excluding the interruption, for recording on the user equipment device.

It is contemplated that the descriptions of FIG. 5 may be used with any other embodiment of this disclosure. In addition, the descriptions described in relation to the algorithm of FIG. 5 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of interruptions imminent during transmission of the television program may be evaluated in parallel, using multiple logical processor threads or the algorithm may be enhanced by incorporating branch prediction. Furthermore, it should be noted that the process of FIG. 5 may be implemented on a combination of appropriately configured software and hardware, and that any of the devices or equipment discussed in relation to FIGS. 3-4 could be used to implement one or more portions of the process.

The pseudocode in FIG. 6 describes a process to determine whether an interruption is imminent during transmission of a television program in accordance with some embodiments of the disclosure. It will be evident to one skilled in the art that the process described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, control circuitry 304 runs a subroutine to initialize variables and prepare to determine whether an interruption is imminent during transmission of the television program, which begins on line 605. For example, in some embodiments control circuitry 304 may copy instructions from non-transitory storage medium (e.g., storage device 308) into RAM or into the cache for processing circuitry 306 during the initialization stage. Additionally, in some embodiments, additional information relating to a subroutine may be retrieved, set, and stored at 601.

At line 605, control circuitry 304 retrieves metadata for the television program from memory. Control circuitry 304 may retrieve the metadata by receiving, for example, a pointer to an array of metadata for multiple media assets. In another example, control circuitry 304 may receive an object of a class, such as an iterator object containing elements of metadata for multiple media assets.

At line 606, control circuitry 304 iterates through the interruptions indicated by the metadata as imminent during transmission of the television program. If only a single interruption is indicated, the loop will only execute once. This loop may be implemented in multiple fashions depending on the choice of hardware and software language used to implement the algorithm of FIG. 6; for example, this may be implemented as part of a "for" or "while" loop.

At line 607, control circuitry 304 identifies information in the metadata relating to an interruption during transmission of the television program. In some embodiments, the information relating to the interruption may be stored as part of a larger data structure or class, and the information relating to the interruption may be obtained through appropriate accessor methods. In some embodiments, the information relating to the interruption may be converted from a string or other non-numeric data type into a numeric data type by means of an appropriate hashing algorithm or may be stored as a primitive data structure and may be directly used.

At line 608, control circuitry 304 determines if the metadata indicates that the television program is not being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication.

If the condition in line 608 is satisfied, at line 609, control circuitry 304 executes a subroutine to return a message that an interruption-free version of the television program is not needed at the user equipment device. In some embodiments this may be achieved by processing circuitry 306 sending the appropriate signals to the processing circuitry. At line 610, control circuitry 304 breaks out of the loop because the condition in line 608 has already been satisfied.

If the condition in line 608 is not satisfied, at line 611, control circuitry 304 determines if the metadata indicates that the television program is being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication.

If the condition in line 611 is satisfied, at line 612, control circuitry 304 executes a subroutine to generate an interruption-free version of the television program for recording on the user equipment device. In some embodiments this may be achieved by processing circuitry 306 sending the appropriate signals to the processing circuitry. At line 613, control circuitry 304 breaks out of the loop because the condition in line 611 has already been satisfied.

At line 615, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 600 described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 609 and 612 to speed operation, or the conditional statements may be replaced with a case-switch. In some embodiments, rather than iterating over all instances of interruptions indicated in the metadata at step 606, in some embodiments the code may be rewritten so control circuitry 304 is instructed to evaluate multiple instances of interruptions imminent during transmission of the television program simultaneously on a plurality of processors or processor threads, lowering the number of iterations needed and potentially speeding up computation time.

Figure 7:
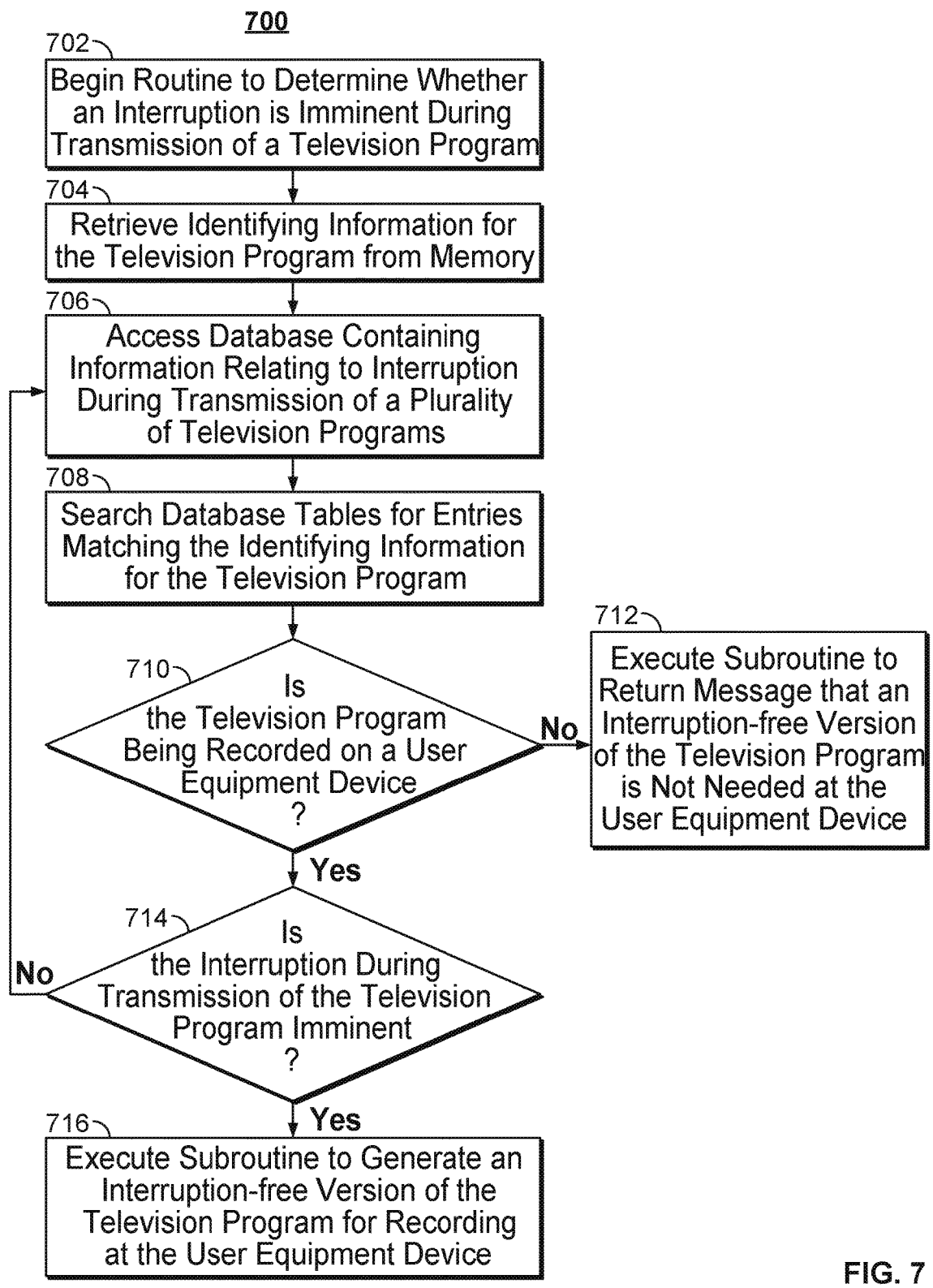
FIG. 7 is a flowchart of an illustrative process for using a database to determine whether an interruption is imminent during transmission of a television program in accordance with some embodiments of the disclosure.

FIGS. 7 and 8 present processes implemented on control circuitry (e.g., control circuitry 304 or control circuitry of preemption service server 424) to determine whether an interruption is imminent during transmission of a television program using a database in accordance with some embodiments of the disclosure. Similar to the algorithms described by FIGS. 5 and 6, in some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process implemented on control circuitry (e.g., control circuitry 304 or control circuitry of preemption service server 424) to search a database and determine whether an interruption is imminent during transmission of a television program in accordance with some embodiments of the disclosure.

At step 702, control circuitry 304 begins a routine to search a database and determine whether an interruption is imminent during transmission of a television program. In some embodiments, this may be done either directly or indirectly in response to a user action or input (e.g., from signals received by control circuitry 304 or user input interface 310).

At step 704, control circuitry 304 proceeds to retrieve identifying information for the television program from memory. In some embodiments, control circuitry 304 may retrieve a single primitive data structure that represents identifying information for the television program. In some embodiments, control circuitry 304 may retrieve the identifying information for the television program from a larger class or data structure.

At step 706, control circuitry 304 accesses a database containing information relating to interruptions during transmission of one or more television programs. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., preemption service server 424).

At step 708, control circuitry 304 searches database tables for entries matching the identifying information for the television program. In some embodiments, this may be done by comparing an identifier, for example, a string or integer representing the storage required for the media asset that matches the types of identifiers used inside the database. In some embodiments, control circuitry 304 may submit a general query to the database for table entries matching the identifying information for the television program. Control circuitry 304 may receive a list of indices or a data structure containing a portion of the database contents. In some embodiments, the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 7 may be implemented using multiple independent or cross-referenced databases.

Control circuitry 304 determines database entries matching the identifying information for the television program. In some embodiments, control circuitry 304 may receive a signal from the database indicating that there are no matching entries. In some embodiments, control circuitry 304 may instead receive a list of indices or data structures with a NULL or dummy value. If control circuitry 304 identifies that there are database entries matching the storage required for the media asset, the algorithm proceeds to step 710.

At step 710, control circuitry 304 determines if the television program is being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication. If the condition is satisfied, the algorithm may proceed to step 714; if the condition is not satisfied, the algorithm may proceed to step 712 instead.

At step 712, control circuitry 304 executes a subroutine to return a message that an interruption-free version of the television program is not needed at the user equipment device. Because the television program is not being recorded on the user equipment device, control circuitry 304 need not generate another stream of the television program, excluding the interruption, for recording on the user equipment device.

At step 714, control circuitry 304 determines whether the interruption is imminent during transmission of the television program. Control circuitry 304 may use the identifying information for the television program and/or related database entries determined during the search. If the condition is satisfied, the algorithm may proceed to step 716; if the condition is not satisfied, the algorithm may proceed to step 706 instead.

At step 716, control circuitry 304 executes a subroutine to generate an interruption-free version of the television program for recording on the user equipment device based on the condition at step 714 being satisfied. Because the television program is being recorded on the user equipment device, control circuitry 304 generates another stream of the television program, excluding the interruption, for recording on the user equipment device.

It is contemplated that the descriptions of FIG. 7 may be used with any other embodiment of this disclosure. In addition, the descriptions described in relation to process 700 of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of process 700. Furthermore, it should be noted that the process of FIG. 7 may be implemented on a combination of appropriately configured software and hardware, and that any of the devices or equipment discussed in relation to FIGS. 3-4 could be used to implement one or more portions of the algorithm.

The pseudocode in FIG. 8 describes a process to determine using a database whether an interruption is imminent during transmission of a television program in accordance with some embodiments of the disclosure. It will be evident to one skilled in the art that process 800 described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 304 runs a subroutine to initialize variables and prepare to determine using a database whether an interruption is imminent during transmission of a television program, which begins on line 805. For example, in some embodiments, control circuitry 304 may copy instructions from non-transitory storage medium (e.g., storage device 308) into RAM or into the cache for processing circuitry 306 during the initialization stage. Additionally, in some embodiments, additional information relating to the subroutine may be retrieved, set, and stored at 801.

At line 805, control circuitry 304 retrieves identifying information for the television program from memory. Control circuitry 304 may retrieve the metadata by receiving, for example, a pointer to an array of metadata for multiple media assets. In another example, control circuitry 304 may receive an object of a class, such as an iterator object containing elements of metadata for multiple media assets.

At line 806, control circuitry 304 iterates through the interruptions indicated by the metadata as imminent during transmission of the television program. If only a single interruption is indicated, the loop will only execute once. This loop may be implemented in multiple fashions depending on the choice of hardware and software language used to implement the algorithm of FIG. 8; for example, this may be implemented as part of a "for" or "while" loop.

At line 807, control circuitry 304 accesses a database containing information relating to interruptions during transmission of one or more television programs. In some embodiments, this database may be stored locally (e.g., on storage device 308) prior to beginning the algorithm. In some embodiments the database may also be accessed by using communications circuitry to transmit information across a communications network (e.g., communications network 414) to a database implemented on a remote storage device (e.g., preemption service server 424).

At line 808, control circuitry 304 searches database tables for entries matching the identifying information for the television program. In some embodiments, this may be done by comparing an identifier, for example, a string or integer representing the storage required for the media asset that matches the types of identifiers used inside the database. In some embodiments, control circuitry 304 may submit a general query to the database for table entries matching the identifying information for the television program. Control circuitry 304 may receive a list of indices or a data structure containing a portion of the database contents. In some embodiments, the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the algorithm of FIG. 8 may be implemented using multiple independent or cross-referenced databases.

Control circuitry 304 determines database entries matching the identifying information for the television program. In some embodiments, control circuitry 304 may receive a signal from the database indicating that there are no matching entries. In some embodiments, control circuitry 304 may instead receive a list of indices or data structures with a NULL or dummy value. If control circuitry 304 identifies that there are database entries matching the storage required for the media asset, control circuitry 304 proceeds to line 809.

At line 809, control circuitry 304 determines if the identifying information indicates that the television program is not being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication.

If the condition in line 809 is satisfied, at line 810, control circuitry 304 executes a subroutine to return a message that an interruption-free version of the television program is not needed at the user equipment device. In some embodiments this may be achieved by processing circuitry 306 sending the appropriate signals to the processing circuitry. At line 811, control circuitry 304 breaks out of the loop because the condition in line 809 has already been satisfied.

If the condition in line 809 is not satisfied, at line 812, control circuitry 304 determines if the identifying information indicates that the television program is being recorded on a user equipment device. In some embodiments, an indication received from the user equipment device that the television program is being recorded thereon may be stored (e.g., on storage device 308) prior to beginning the process. In some embodiments, control circuitry 304 may directly query the user equipment device for the indication.

If the condition in line 812 is satisfied, at line 813, control circuitry 304 executes a subroutine to generate an interruption-free version of the television program for recording on the user equipment device. In some embodiments this may be achieved by processing circuitry 306 sending the appropriate signals to the processing circuitry. At line 814, control circuitry 304 breaks out of the loop because the condition in line 812 has already been satisfied.

At line 816, control circuitry 304 runs a termination subroutine after the algorithm has performed its function. For example, in some embodiments control circuitry 304 may destruct variables, perform garbage collection, free memory or clear the cache of processing circuitry 306.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 304 is instructed to evaluate multiple instances of interruptions imminent during transmission of the television program and submit multiple database queries simultaneously using a plurality of processors or processor threads.

It is also understood that although we may describe control circuitry 304 interacting with a single database, this is only a single embodiment described for illustrative purposes, and the algorithm of FIG. 8 may be implemented using multiple independent or cross-referenced databases. For example, a database stored locally (e.g., on storage 308) may index or cross-reference a database stored remotely (e.g., media guidance data source 418 or preemption service server 424), which may be accessible through any number of communication channels (e.g., communications network 414). In some embodiments, this may allow control circuitry 304 to utilize a look-up table or database front-end efficiently stored on a small local drive to access a larger database stored on a remote server on demand.

Figure 9:
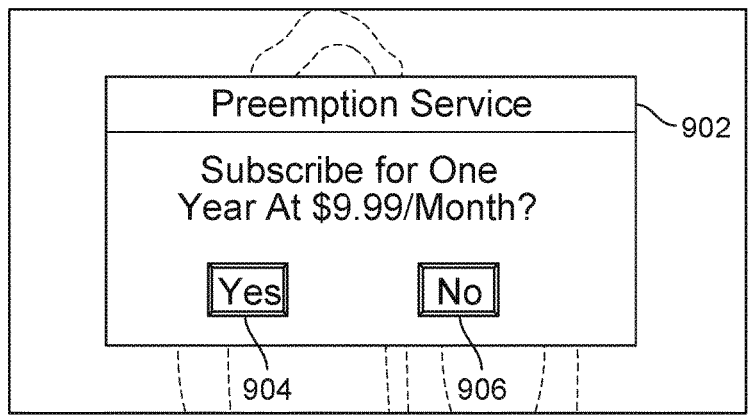
FIG. 9 is a diagram of a display relating to a preemption service for interruption-free delivery of a television program in accordance with some embodiments of the disclosure.
Figure 10:
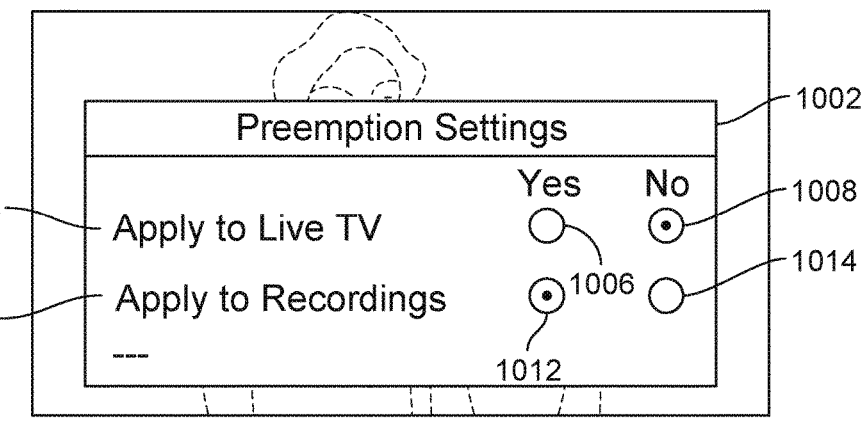
FIG. 10 is a diagram of another display relating to a preemption service for interruption-free delivery of a television program in accordance with some embodiments of the disclosure.
Figure 11:
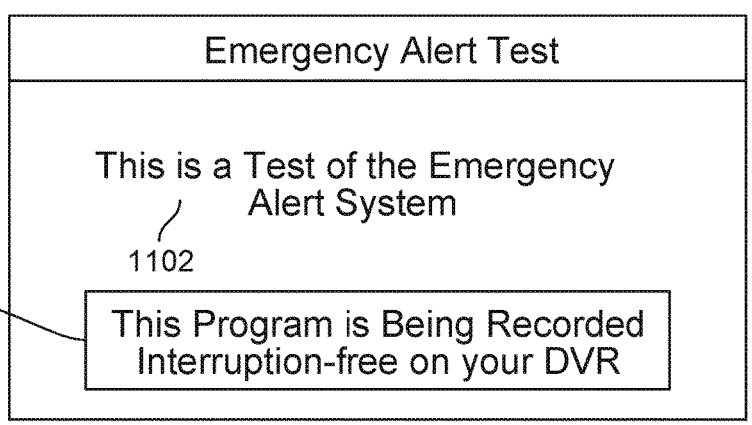
FIG. 11 is a diagram of yet another display relating to a preemption service for interruption-free delivery of a television program in accordance with some embodiments of the disclosure.

FIGS. 9-11 are diagrams of displays relating to a preemption service for interruption-free delivery of a television program in accordance with some embodiments of the disclosure. FIG. 9 depicts illustrative display 900 relating to a preemption service for interruption-free delivery of a television program. For example, an interruption or preemption may be received from the Emergency Alert System, which is a national public warning system that requires broadcasters, cable television systems, wireless cable systems, satellite cable systems, and other suitable providers to provide communications capability to the President to address the American public during a national emergency. The system may also be used by state and local authorities to deliver important emergency information, such as AMBER alerts, weather information, and other suitable information targeted to specific areas. In another example, an interruption or preemption may be received in the form of an unscheduled news broadcast regarding a newsworthy event.

If a television program is being recorded during transmission of such an emergency message, the message is included in the recorded television program as well. For example, the television program may be interrupted or preempted by an emergency alert message for an urgent weather notification, a Presidential announcement, or another suitable message. In another example, the television program may be interrupted or preempted by a local news broadcast of a noteworthy event, such as a car chase involving hot pursuit of suspects by local police. In display 900, window 902 provides information regarding subscribing to the preemption service. The viewer may subscribe to the preemption service for free or in exchange for a payment. In this example, the user may subscribe to preemption service for $9.99 per month by selecting option 904. The preemption service may exclude interruptions or preemptions from recorded programs so that when the viewer watches the recorded program at a later time, the viewer's experience is not interrupted or preempted by an emergency alert or similar message. The viewer may decline subscription to the preemption service by selection option 906.

The preemption service is advantageous because the user is not aware that the source of the recorded television program has been switched. The service provider complies with their requirement to transmit the emergency message to the user while he or she is watching the television program. At the same time, the user equipment device advantageously stores an interruption-free version of the television program that the user can watch at a later time without the interruption being included during the recording.

FIG. 10 depicts illustrative display 1000 relating to a preemption service for interruption-free delivery of a television program. In display 1000, window 1002 provides settings for the preemption service. Setting 1004 is concerned with applying the preemption service to live TV by selecting option 1006 or 1008. Setting 1004 may be subject to the requirement of content providers to broadcast emergency messages as they are received. For example, setting 1004 may allow the user to prevent interruptions from unscheduled news broadcasts but still receive emergency alert messages that the content provider is mandated to display. Setting 1010 is concerned with applying the preemption service to recordings by selecting option 1012 or 1014. The preemption service may exclude interruptions or preemptions from recorded programs so that when the viewer watches the recorded program at a later time, the viewer's experience is not interrupted or preempted by an emergency alert or similar message.

FIG. 11 depicts illustrative display 1100 relating to a preemption service for interruption-free delivery of a television program. In display 1100, screen 1102 displays an emergency alert test message that has interrupted the television program the user was viewing as well as recording. However, the preemption service was aware of the imminent interruption and switched the recording of the television program to an alternate stream that excludes the emergency alert test message. Prompt 1104 notifies the user that the television program is being recorded interruption-free.

In this example, the user viewing the television program on the user equipment device at substantially the same time as the transmission of the television program experiences the interruption during the television program. Because content providers are required to comply and transmit the emergency alert system messages as they are received, the user viewing a television program as it is broadcast, such as a football game, may receive the emergency message as intended.

However, when the user views the television program on the user equipment device at a time after the transmission of the television program, the user does not experience the interruption during the television program. Because content providers are required to transmit emergency messages as they are received, they are not necessarily required to include the emergency messages in recorded versions of the television program. For example, the video-on-demand version of a television program, which may have been interrupted by an emergency message when being broadcast, may not include the interruption when viewed at a later time. Similarly, a recorded version of the television program may not include the interruption when the user is viewing the television program at a later time.

In some embodiments, the alternate stream excluding the interruption or preemption is generated as a switched digital video stream. Switched digital video technology typically sends only channels requested by viewers and saves content provider bandwidth. The technology may be used to create an alternate stream of the television program the user is currently recording. The systems and methods described herein may be applied using this technology to send the alternate stream to the user equipment device that excludes the imminent interruption in the television program. More information on switched digital video technology may be found at "Switched Digital Video Architecture Guide," CISCO Systems, 4012490 Rev B, June 2012, incorporated herein by reference in its entirety.

In some embodiments, a user viewing the television program on the user equipment device at a time after the transmission of the television program receives an option to view the television program via a video-on-demand service. For example, the user may set a recording for "Young and the Restless" for 12:30 pm. Unfortunately, at 12:45 pm, a car chase began between the local police and three thieves in a Ferrari. The television provider broadcasting "Young and the Restless" may decide to interrupt the television program with helicopter footage of the car chase. The television provider may expect more viewers to tune in for the car chase rather than the daytime drama. In the evening that day, when the user selects the "Young and the Restless" recording, the user equipment device may generate for display an option to view the television program via a video-on-demand service instead.

In some embodiments, when the television program is interrupted or expected to be interrupted with an emergency message, the television provider (or a video distributor or another suitable service provider) may initiate a recording of the television program, excluding the emergency message, on a server or another suitable device at their facility or elsewhere in the cloud. The uninterrupted recording of the television program may be stored by the television provider for future use by their subscribers as a video-on-demand version of the television program. This may be advantageous to the user because cloud-based access to the television program may allow the user equipment device to receive the uninterrupted recording of the television program from the cloud rather than storing content locally and using the memory of the user equipment device.

In some embodiments, a user viewing the television program on the user equipment device at a time after the transmission of the television program receives an option to record the television program at another time when the television program is rebroadcast. Following the example discussed above, when the user selects the "Young and the Restless" recording, the user equipment device may generate for display an option to record the television program again when it is rebroadcast, e.g., at a later time that night or the next day.

In some embodiments, the second stream is generated in response to receiving a threshold number of indications from a plurality of user equipment devices that the television program is being recorded. The process of generating a second stream of the television program may use bandwidth at the content provider's systems. Moreover, if second streams are generated for a significant number of television programs, the bandwidth requirements may easily increase twofold. To address this issue, the content provider system may generate a second stream for a television program only if a threshold number of users are recording the program. The content provider system may receive indications from user equipment devices when users initiate recording of the television program. If an interruption is imminent during transmission of the television program, the content provider system may only generate and transmit a second stream excluding the interruption if a threshold number of user equipment devices have indicated that the television program is being recorded.

Figure 12:
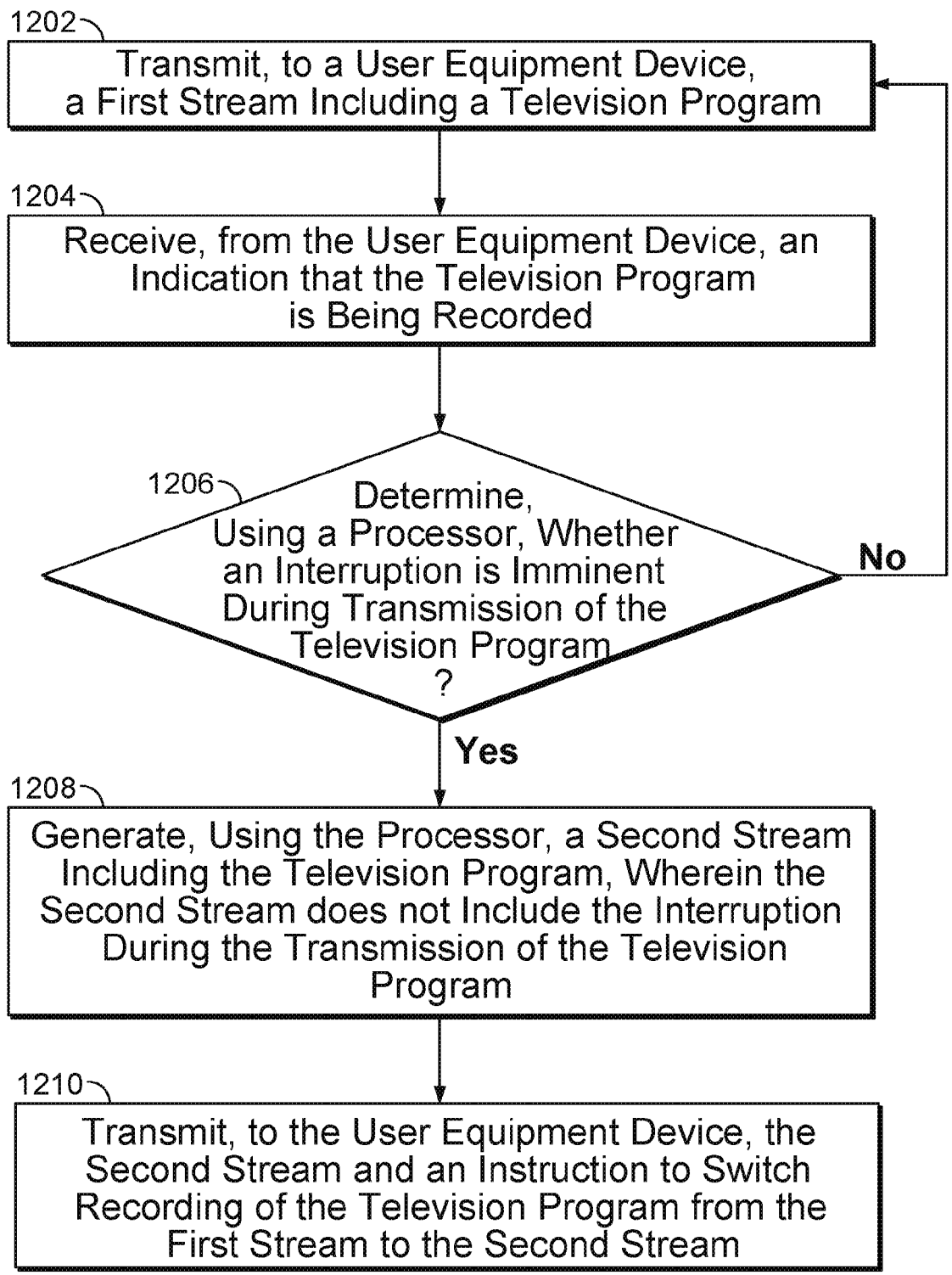
FIG. 12 is a flowchart of an illustrative process for transmitting an interruption-free version of a television program for recording on a user equipment device in accordance with some embodiments of the disclosure.

FIG. 12 is a flowchart of illustrative process 1200 for transmitting an interruption-free version of a television program for recording on a user equipment device in accordance with some embodiments of the disclosure. It should be noted that process 1200 or any step thereof could be performed on, or provided by, any of the devices shown in FIGS. 3-4. For example, process 1200 may be executed by control circuitry 304 (FIG. 3), control circuitry of media content source 416, media guidance data source 418, preemption service server 424 (FIG. 4), or other suitable circuitry. In addition, one or more steps of process 1200 may be incorporated into or combined with one or more steps of any other process or embodiment (e.g., FIGS. 5-8 and 13).

Control circuitry of a server (e.g., control circuitry 304 (FIG. 3), control circuitry of media content source 416, media guidance data source 418, preemption service server 424 (FIG. 4), or other suitable circuitry) transmits an interruption-free version of a television program for recording on a user equipment device (e.g., user equipment device 300). The server may include communications circuitry in communication with the user equipment device (e.g., user equipment device 300).

At step 1202, the control circuitry transmits a first stream, including a television program, to the user equipment device (e.g., user equipment device 300). For example, the control circuitry may transmit a stream for a football game the user wishes to watch. At step 1204, the control circuitry receives an indication from the user equipment device (e.g., user equipment device 300) that the television program is being recorded. For example, the user may wish to record the football game for viewing at a later time.

At step 1206, the control circuitry determines whether an interruption is imminent during transmission of the television program. For example, the control circuitry may inspect metadata of the television program to determine that an interruption or preemption is scheduled during the transmission of the football game. In another example, the control circuitry may query a database to determine whether an interruption or preemption is scheduled during the transmission of the football game. In yet another example, the control circuitry may determine or receive an indication of an imminent interruption via any other suitable mechanism.

If the control circuitry determines that an interruption is not imminent during transmission of the television program, the control circuitry returns to step 1202. If the control circuitry determines that an interruption is imminent during transmission of the television program, at step 1208, the control circuitry generates a second stream including the television program. The second stream includes the television program but does not include the interruption during the transmission of the television program. For example, after determining that the football game is about to be interrupted by an emergency message, the control circuitry may generate a second stream including the football game. This stream does not include the emergency message imminent during transmission of the football game in the first stream.

At step 1210, the control circuitry transmits the second stream to the user equipment device (e.g., user equipment device 300). The control circuitry also transmits an instruction to the user equipment device (e.g., user equipment device 300) to switch recording of the television program from the first stream to the second stream. For example, the user equipment device switches the source of the recording of the football game from the first stream to the second stream. However, the first stream continues to be shown to the user in case he or she is watching the football game while it is being recorded. The emergency message is still shown to the user watching the football game live but is excluded from the recorded television program on the user equipment device.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 12.

Figure 13:
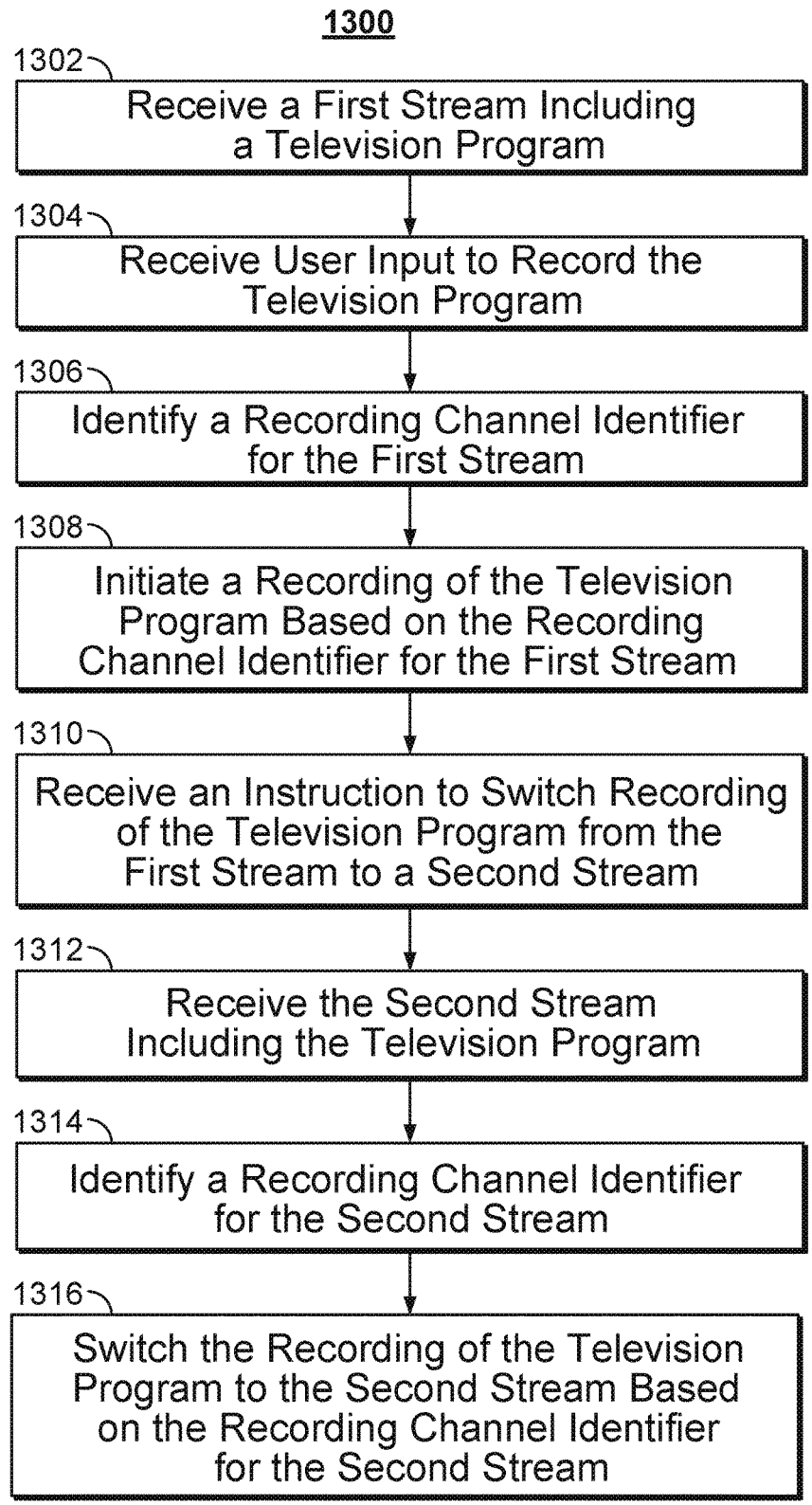
FIG. 13 is a flowchart of an illustrative process for receiving an interruption-free version of a television program for recording on a user equipment device in accordance with some embodiments of the disclosure.

FIG. 13 is a flowchart of illustrative process 1300 for receiving an interruption-free version of a television program for recording on a user equipment device in accordance with some embodiments of the disclosure. It should be noted that process 1300 or any step thereof could be performed on, or provided by, any of the devices shown in FIGS. 3-4. For example, process 1300 may be executed by control circuitry 304 (FIG. 3), control circuitry of media content source 416, media guidance data source 418, preemption service server 424 (FIG. 4), or other suitable circuitry. In addition, one or more steps of process 1300 may be incorporated into or combined with one or more steps of any other process or embodiment (e.g., FIGS. 5-8 and 12).

Control circuitry (e.g., control circuitry 304 (FIG. 3) or control circuitry of media content source 416, media guidance data source 418, preemption service server 424 (FIG. 4), or other suitable circuitry) receives an interruption-free version of a television program for recording on the user equipment device (e.g., user equipment device 300). The user equipment device (e.g., user equipment device 300) may include communications circuitry in communication with a server transmitting the television program.

At step 1302, the control circuitry receives from the server a first stream including the television program. For example, the control circuitry of the user equipment device (e.g., user equipment device 300) may receive a stream for a football game the user wishes to watch. At step 1304, the control circuitry receives user input at the user equipment device (e.g., user equipment device 300) to record the television program. For example, the user may wish to record the football game for viewing at a later time.

At step 1306, the control circuitry identifies a recording channel identifier for the first stream. For example, the recording channel identifier assists the user equipment device (e.g., user equipment device 300) in recording the stream including the football game. At step 1308, the control circuitry initiates recording of the television program based on the recording channel identifier for the first stream. At step 1310, the control circuitry receives an instruction to switch recording of the television program from the first stream to a second stream. For example, the user equipment device (e.g., user equipment device 300) may receive an instruction to switch the source of the recording of the football game from the first stream to the second stream.

At step 1312, the control circuitry receives from the server the second stream including the television program. For example, the second stream may not include an emergency message imminent during transmission of the football game in the first stream. At step 1314, the control circuitry identifies a recording channel identifier for the second stream. For example, the recording channel identifier assists the user equipment device (e.g., user equipment device 300) in recording the stream including the football game. At step 1316, the control circuitry switches the recording of the television program to the second stream based on the recording channel identifier for the second stream. However, the first stream continues to be shown to the user in case he or she is watching the football game while it is being recorded. The emergency message is still shown to the user watching the football game live but is excluded from the recorded television program on the user equipment device (e.g., user equipment device 300).

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 13.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for receiving an interruption-free version of a television program for recording on a user equipment device, comprising:
receiving, from a server, a first stream including a television program, the first stream being subject to an interruption that will distort playback of the television program;
receiving, at the user equipment device, user input to record the television program;
identifying, using the user equipment device, a recording channel identifier for the first stream;
initiating, using the user equipment device, a recording of the television program based on the recording channel identifier for the first stream;
receiving, from the server, an instruction to switch recording of the television program from the first stream to a second stream, the second stream comprising a same television program as the television program, and the second stream not being subject to the interruption;
receiving, from the server, the second stream including the same television program;
identifying, using the user equipment device, a recording channel identifier for the second stream; and
switching, using the user equipment device, the recording of the same television program to the second stream based on the recording channel identifier for the second stream.

2. The method of claim 1, wherein an interruption is imminent during transmission of the television program from the first stream, and wherein the interruption is absent during recording of the same television program from the second stream.

3. The method of claim 2, wherein the interruption includes one or more of an emergency alert message and an unscheduled news broadcast.

4. The method of claim 2, wherein a user viewing the television program on the user equipment device at substantially the same time as the transmission of the television program experiences the interruption during the television program.

5. The method of claim 2, wherein a user viewing the same television program on the user equipment device at a time after the transmission of the television program does not experience the interruption during the television program.

6. The method of claim 1, wherein the instruction to switch the recording of the same television program from the first stream to the second stream includes the recording channel identifier for the second stream.

7. The method of claim 1, wherein the second stream is generated as a switched digital video stream.

8. The method of claim 1, wherein a user viewing the television program on the user equipment device at a time after the transmission of the television program receives an option to view the television program via a video-on-demand service.

9. The method of claim 1, wherein a user viewing the television program on the user equipment device at a time after the transmission of the television program receives an option to record the television program at another time when the television program is rebroadcast.

10. The method of claim 1, wherein the second stream is generated in response to receiving a threshold number of indications from a plurality of user equipment devices that the television program is being recorded.

11. A system for receiving an interruption-free version of a television program for recording on a user equipment device, comprising:
communications circuitry in communication with a server; and
control circuitry configured to:

receive, from the server, a first stream including a television program, the first stream being subject to an interruption that will distort playback of the television program;
receive user input to record the television program;
identify a recording channel identifier for the first stream;
initiate a recording of the television program based on the recording channel identifier for the first stream;
receive, from the server, an instruction to switch recording of the television program from the first stream to a second stream, the second stream comprising a same television program as the television program, and the second stream not being subject to the interruption;
receive, from the server, the second stream including the same television program;
identify a recording channel identifier for the second stream; and
switch the recording of the same television program to the second stream based on the recording channel identifier for the second stream.

12. The system of claim 11, wherein an interruption is imminent during transmission of the television program from the first stream, and wherein the interruption is absent during recording of the same television program from the second stream.

13. The system of claim 12, wherein the interruption includes one or more of an emergency alert message and an unscheduled news broadcast.

14. The system of claim 12, wherein a user viewing the television program on the user equipment device at substantially the same time as the transmission of the television program experiences the interruption during the television program.

15. The system of claim 12, wherein a user viewing the same television program on the user equipment device at a time after the transmission of the television program does not experience the interruption during the television program.

16. The system of claim 11, wherein the instruction to switch the recording of the same television program from the first stream to the second stream includes the recording channel identifier for the second stream.

17. The system of claim 11, wherein the second stream is generated as a switched digital video stream.

18. The system of claim 11, wherein a user viewing the television program on the user equipment device at a time after the transmission of the television program receives an option to view the television program via a video-on-demand service.

19. The system of claim 11, wherein a user viewing the television program on the user equipment device at a time after the transmission of the television program receives an option to record the television program at another time when the television program is rebroadcast.

20. The system of claim 11, wherein the second stream is generated in response to receiving a threshold number of indications from a plurality of user equipment devices that the television program is being recorded.

* * * * *